(12) United States Patent
Takeichi

(10) Patent No.: US 10,876,885 B2
(45) Date of Patent: Dec. 29, 2020

(54) HOPPER WITH GAP-CLOSING EDGE PORTIONS

(71) Applicant: Ishida Co., Ltd., Kyoto (JP)

(72) Inventor: Shinji Takeichi, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 196 days.

(21) Appl. No.: 16/200,680

(22) Filed: Nov. 27, 2018

(65) Prior Publication Data
US 2019/0162586 A1 May 30, 2019

(30) Foreign Application Priority Data
Nov. 29, 2017 (JP) .................. 2017-228482

(51) Int. Cl.
*G01G 19/393* (2006.01)
*G01G 13/18* (2006.01)
(Continued)

(52) U.S. Cl.
CPC ............. *G01G 19/52* (2013.01); *G01G 13/22* (2013.01); *G01G 19/393* (2013.01); *B65B 37/04* (2013.01);
(Continued)

(58) Field of Classification Search
CPC .... G01G 13/024; G01G 13/006; G01G 13/22; G01G 19/387; G01G 19/393;
(Continued)

(56) References Cited

U.S. PATENT DOCUMENTS 3,239,108 A * 3/1966 Warner ................... B65B 37/04
222/196
4,516,644 A * 5/1985 Fukuda ................ G01G 19/393
177/122

(Continued)

FOREIGN PATENT DOCUMENTS

| EP | 0 852 328 A1 | 7/1998 |
| JP | 2016-114375 A | 6/2016 |
| WO | 2013/183647 A1 | 12/2013 |
| WO | 2017/110558 A1 | 6/2017 |

OTHER PUBLICATIONS

The extended European search report issued by the European Patent Office dated Mar. 26, 2019, which corresponds to European Patent Application No. 18208682.7-1001 and is related to U.S. Appl. No. 16/200,680.

*Primary Examiner* — Randy W Gibson
(74) *Attorney, Agent, or Firm* — Studebaker & Brackett PC

(57) ABSTRACT

The hopper body has a third sidewall and a fourth sidewall that face each other in a second direction intersecting with the first direction and that connect between the first sidewall and the second sidewall, and a first corner portion adjacent to the distal end portion of the trough in the third sidewall and a second corner portion adjacent to the distal end portion of the trough in the fourth sidewall are bent in direction away from the distal end portion of the trough and also a first edge portion adjacent to the distal end portion of the trough in the first corner portion and a second edge portion adjacent to the distal end portion of the trough in the second corner portion are bent in direction closer to the distal end portion of the trough.

17 Claims, 7 Drawing Sheets

(51) Int. Cl.

| | |
|---|---|
| *B65B 37/04* | (2006.01) |
| *B65D 88/26* | (2006.01) |
| *B65G 27/00* | (2006.01) |
| *G01G 19/52* | (2006.01) |
| *G01G 13/22* | (2006.01) |
| *G01G 13/02* | (2006.01) |
| *G01G 13/00* | (2006.01) |
| *B65D 88/32* | (2006.01) |

(52) U.S. Cl.
CPC .............. *B65D 88/26* (2013.01); *B65D 88/32* (2013.01); *B65G 27/00* (2013.01); *B65G 2812/03* (2013.01); *B65G 2812/0384* (2013.01); *G01G 13/006* (2013.01); *G01G 13/024* (2013.01); *G01G 13/18* (2013.01)

(58) Field of Classification Search
CPC ........ G01G 19/52; G01G 13/18; B65B 37/04; B65D 88/26; B65D 88/32; B65G 27/00; B65G 2812/03; B65G 2812/0384
See application file for complete search history.

(56) References Cited

U.S. PATENT DOCUMENTS

| | | | | | |
|---|---|---|---|---|---|
| 4,596,327 | A | * | 6/1986 | Yamano | B65G 11/023 177/25.18 |
| 5,258,581 | A | * | 11/1993 | Pearce | G01G 19/393 177/25.18 |
| 5,379,923 | A | * | 1/1995 | Sagastegui | G01G 13/18 177/108 |
| 5,736,683 | A | * | 4/1998 | Howard | G01G 19/393 177/105 |
| 6,188,029 | B1 | * | 2/2001 | Miyamoto | G01G 19/393 177/105 |
| 6,365,845 | B1 | * | 4/2002 | Pearce | G01G 19/393 177/180 |
| 7,053,317 | B2 | * | 5/2006 | Asai | G01G 13/16 177/103 |
| 10,018,496 | B2 | * | 7/2018 | Morimoto | G01G 19/393 |
| 10,472,181 | B1 | * | 11/2019 | Eto | B65G 47/68 |
| 2013/0216338 | A1 | * | 8/2013 | Suzuki | B65D 88/54 414/288 |
| 2020/0200587 | A1 | * | 6/2020 | Takeichi | G01G 19/387 |

* cited by examiner

PRIOR ART

PRIOR ART

HOPPER WITH GAP-CLOSING EDGE PORTIONS

TECHNICAL FIELD

The present disclosure relates to a hopper configured to receive and discharge articles supplied from a supply feeder, and to a combination weighing device equipped therewith.

BACKGROUND

A combination weighing device has been known as an automatic weighing device that distributes, supplies, and weighs articles having variations in single body mass in a plurality of weighing machines and that combines the respective obtained measured values so as to be able to obtain the articles of constant mass. In this combination weighing device, after the articles thrown in to the central portion of the device are distributed to a plurality of radially arrayed supply feeders, the articles of an adequate amount each are supplied to each of the weighing machines from the corresponding supply feeder.

The combination weighing device includes a cone-shaped distributing feeder configured to distribute the articles thrown in to the central upper portion of the device to the periphery, a plurality of supply feeders radially arrayed in the periphery and configured to individually convey the articles toward the distal end portion, and a plurality of weighing machines arrayed below the distal end portions of the supply feeders. Each supply feeder includes a trough configured to convey the articles, and an electromagnetic vibration device configured to exert vibration on the trough. Each weighing machine includes a pool hopper at an upper stage, and a weighing hopper provided below the pool hopper of the upper stage.

FIG. 6 is an external perspective view of a trough and a pool hopper in a conventional combination weighing device as viewed obliquely from above. A distal end portion E along the conveying direction of each supply feeder RF is arranged so as to face an opening of a pool hopper PH, and articles M are supplied to the pool hopper PH from the distal end portion E. However, depending on the type or the deposition amount of the articles M, the articles M may be intertwined, and the articles M may jump out from gaps G illustrated in the perspective view of FIG. 6, that is, one of the gaps G between a sidewall T1 of a trough T and an inclined wall DW of the pool hopper PH and the other gap G between a sidewall T2 of the trough T and the other inclined wall DW of the pool hopper PH.

The jumped-out articles M may fall down as is to a collecting chute below, and may be bagged together with the articles M that are measured to a constant amount or be bitten by a seal portion of a bag, and the bagged product may result in a defective product. Thus, depending on the type of the articles M, as in a device described in Japanese Unexamined Patent Publication No. 2016-114375 (JP-A-2016-114375), blocking plates for preventing spills may be provided along the upper edge portions of the sidewalls of the pool hoppers.

SUMMARY

Because these blocking plates are detachably attached, there are problems in that the cost is increased, the number of components is also increased, and it takes time for cleaning. Thus, there is an idea of, by pushing in the distal end portion E of the trough T of FIG. 7 deep into the inner side of the pool hopper PH, increasing the amount of overlap between the distal end portion E and the pool hopper PH. However, in this case, when the pool hopper PH is removed by lifting it up, there are problems in that the pool hopper PH may interfere with the distal end portion E of the trough T and may be difficult to remove. Furthermore, when the article is relatively long, there are problems in that a bridge may take place between the distal end portion E of the trough T and the inner wall of the pool hopper PH, and the articles may get stuck.

An object of one aspect of the present disclosure is to provide a new hopper that is capable of solving with a simple structure, and a combination weighing device equipped therewith.

A hopper according to one aspect of the present disclosure includes: a hopper body having an upper end opening to which articles are supplied from a trough configured to convey the articles along a first direction and a lower end opening from which the articles are discharged; and a gate configured to open and close the lower end opening, in which the hopper body has a first sidewall provided below a distal end portion of the trough in a conveying direction of the articles, and a second sidewall provided so as to face the first sidewall in the first direction, an upper end of the first sidewall is formed at a position lower than an upper end of the second sidewall, the hopper body has a third sidewall and a fourth sidewall that face each other in a second direction intersecting with the first direction and that connect between the first sidewall and the second sidewall, and a first corner portion adjacent to the distal end portion of the trough in the third sidewall and a second corner portion adjacent to the distal end portion of the trough in the fourth sidewall are bent in direction away from the distal end portion of the trough and also a first edge portion adjacent to the distal end portion of the trough in the first corner portion and a second edge portion adjacent to the distal end portion of the trough in the second corner portion are bent in direction closer to the distal end portion of the trough.

With such a simple structure, it is possible to prevent the articles from jumping out from the gaps between the distal end portion of the trough and each of the corner portions that are bent in direction away from the distal end portion of the trough. Thus, it has an effect in that no adverse effect is exerted on packaging of the articles at a subsequent process.

In the hopper according to one aspect of the present disclosure, the third sidewall may have a first body portion, the first corner portion that is bent with respect to the first body portion, and the first edge portion that is bent with respect to the first corner portion, and the fourth sidewall may have a second body portion that is arranged substantially parallel to the first body portion, the second corner portion that is bent with respect to the second body portion, and the second edge portion that is bent with respect to the second corner portion. With such a third sidewall, the first corner portion and the first edge portion can be easily formed by bending. Furthermore, with such a fourth sidewall, the second corner portion and the second edge portion can be easily formed by bending.

In the hopper according to one aspect of the present disclosure, the first corner portion and the second corner portion may be bent in direction away from each other in the second direction, and the first edge portion and the second edge portion may be bent in direction closer to each other in the second direction. With this configuration, it is possible to widely receive the articles that are supplied from the trough and it is possible to prevent the articles from jumping out from the hopper.

In the hopper according to one aspect of the present disclosure, the first corner portion may be formed to include a part of an edge portion that connects an upper end of the first sidewall and an upper end of the second sidewall in the third sidewall, and the second corner portion may be formed to include a part of an edge portion that connects the upper end of the first sidewall and the upper end of the second sidewall in the fourth sidewall. With this configuration, it is possible to reduce the articles jumping out from the gap between the first corner portion and the distal end portion of the trough and the gap between the second corner portion and the distal end portion of the trough.

In the hopper according to one aspect of the present disclosure, the trough may include a bottom surface that is a conveying surface for the article, and a pair of sidewalls that stand inclining in directions away from each other in the second direction from both end portions along the first direction in the bottom surface, the first corner portion may be inclined along one of the sidewalls of the trough, the second corner portion may be inclined along the other sidewall of the trough, the first edge portion may be in close proximity to the one sidewall of the trough in a non-contact state, and the second edge portion may be in close proximity to the other sidewall of the trough in a non-contact state.

Accordingly, because it is possible to reduce the articles jumping out from the gaps between the sidewall of the trough and each of the corner portions of the hopper, the hopper that is capable of handling a wide variety of articles and is excellent in versatility can be obtained. Furthermore, by the configuration with only bending the edge portion of each of the corner portions toward the trough side, it is possible to prevent the articles from jumping out.

In addition, a combination weighing device according to one aspect of the present disclosure may include: a plurality of supply feeders configured to convey articles; and a plurality of above-described hoppers that are arrayed below distal end portions in the first direction of the troughs included in the supply feeders so as to correspond thereto, in which the distal end portions of the supply feeders may be arranged above the upper end openings of the corresponding hoppers.

Accordingly, because it is possible to reduce the articles jumping out from the hoppers even when a variety of articles are supplied to the hoppers from the troughs, a combination weighing device of high versatility can be obtained.

According to one aspect of the present disclosure, with a simple structure, it is possible to prevent the articles that are thrown in to the hopper from the supply feeder from jumping out from the hopper.

DETAILED DESCRIPTION

With reference to FIGS. 1 to 5, the following describes a pool hopper (hopper) 100 according to an embodiment and a combination weighing device 200 that is equipped with the hoppers. The embodiment illustrated in those drawings, however, is not intended to limit the technical scope of one aspect of the present disclosure. In FIGS. 1 to 5, members having identical operations and functions are given identical reference signs.

Configuration of Combination Weighing Device 200

Figure 1:
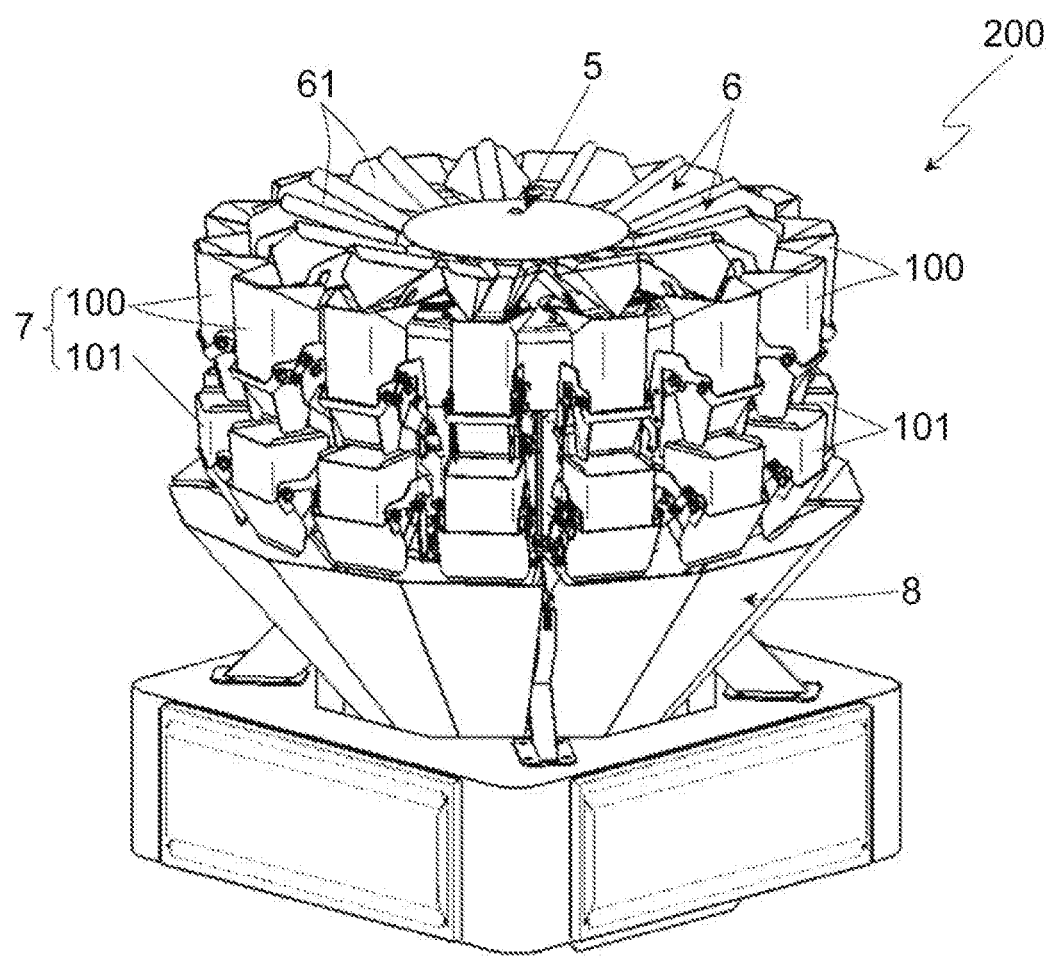
FIG. 1 is an external perspective view illustrating a combination weighing device including pool hoppers according to an embodiment.
Figure 2:
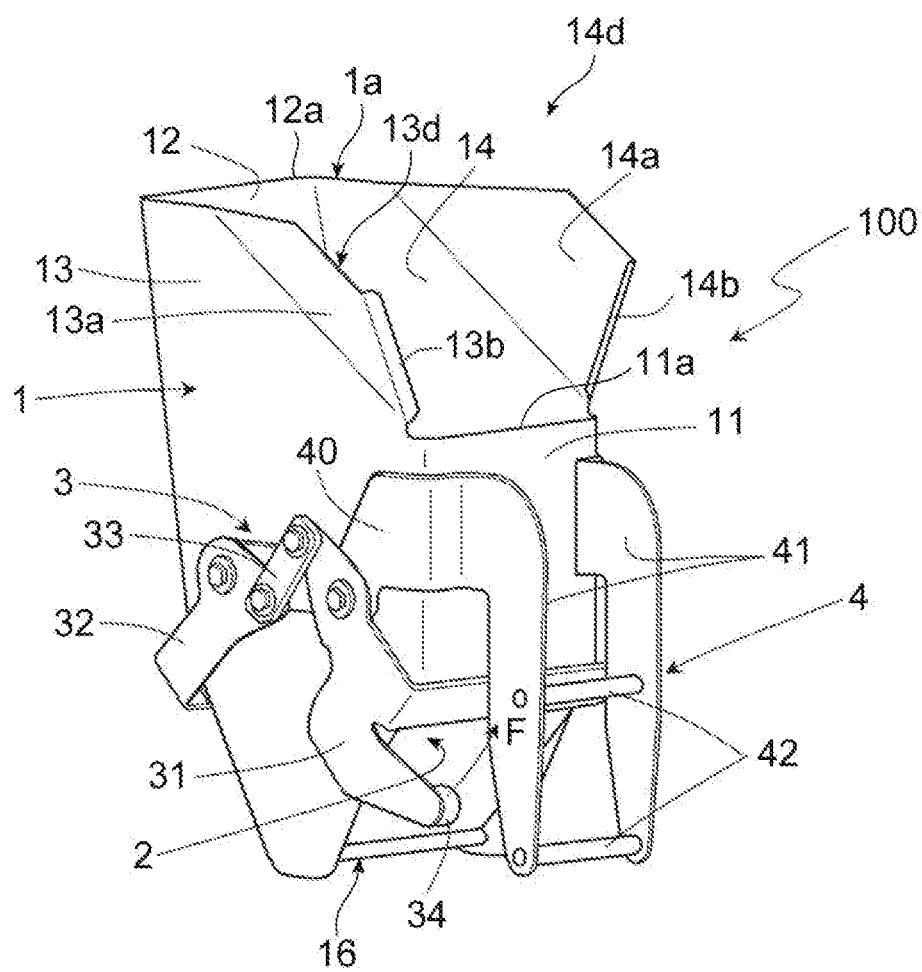
FIG. 2 is an external perspective view of the pool hopper of the embodiment.

FIG. 1 is an external perspective view illustrating a combination weighing device including pool hoppers of the embodiment. FIG. 2 is an external perspective view of a trough and the pool hopper of the embodiment viewed obliquely from above. As illustrated in FIGS. 1 and 2, the combination weighing device 200 includes a distributing feeder 5, a plurality of supply feeders 6, a plurality of weighing machines 7, and a collecting chute S. In addition, below the combination weighing device 200, a packaging device not depicted is arranged.

The distributing feeder 5 distributes articles M thrown in to the central upper portion of the device toward the periphery. The distributing feeder 5 is formed in a cone shape. The supply feeders 6 are radially arrayed around the distributing feeder 5. The supply feeders 6 individually convey the articles M toward the distal end portion in the conveying direction. The plurality of weighing machines 7 are arrayed below the distal end portions of the supply feeders 6.

Each weighing machine 7 includes the pool hopper 100 at the upper stage and a weighing hopper 101 at the lower stage. In each weighing machine 7, when the weighing hopper 101 becomes empty (when the articles M are discharged to the collecting chute S), the articles M are supplied to the relevant weighing hopper 101 from the pool hopper 100 at the upper stage and, when the pool hopper 100 at the upper stage becomes empty (when the articles M are discharged to the weighing hopper 101), the articles M are individually supplied to the pool hopper 100 from the supply feeder 6 corresponding thereto.

Each supply feeder 6 has a known configuration in which a trough 61 configured to convey the articles M and an electromagnetic vibration device not depicted configured to exert vibration on the trough 61 are included. The distal end portion 61a in the conveying direction of each supply feeder 6, that is, the distal end portion 61a in the conveying direction of the trough 61, is made to face an upper end opening 1a of the pool hopper 100, and the articles M are supplied to the pool hopper 100 from the distal end portion 61a.

Structure of Pool Hopper 100

Figure 3:
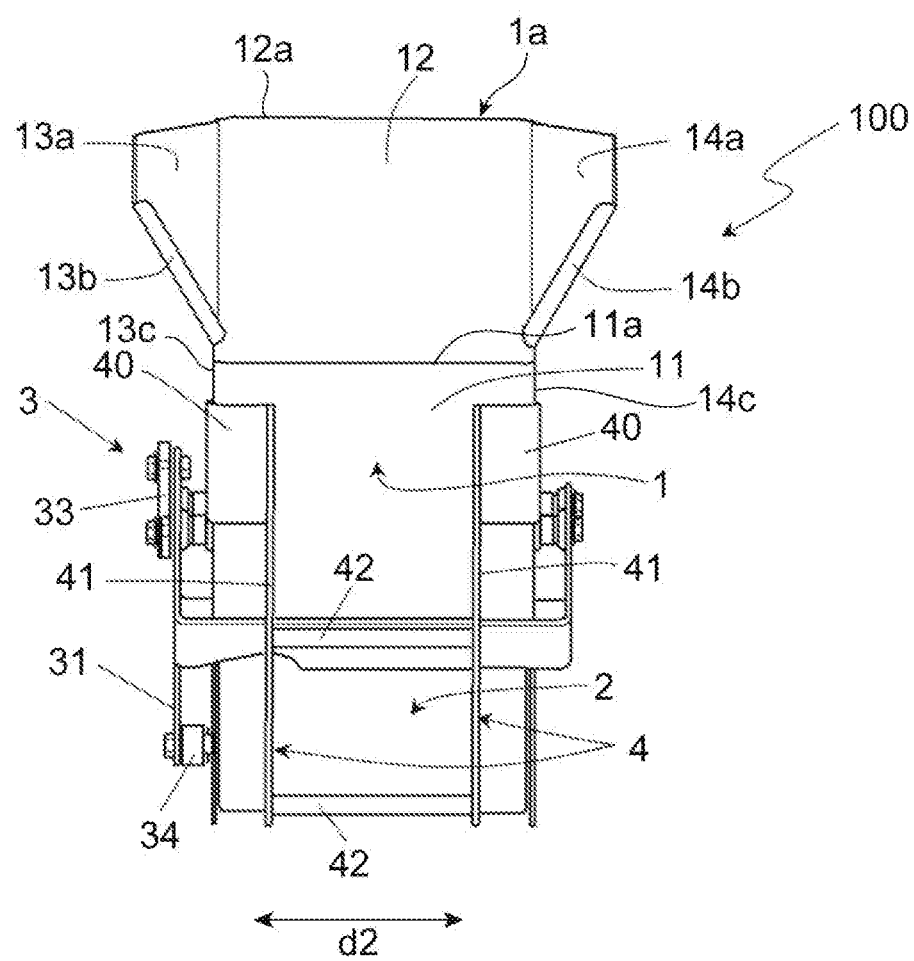
FIG. 3 is a rear view of the pool hopper in FIG. 2 in a slightly stooped state.
Figure 4:
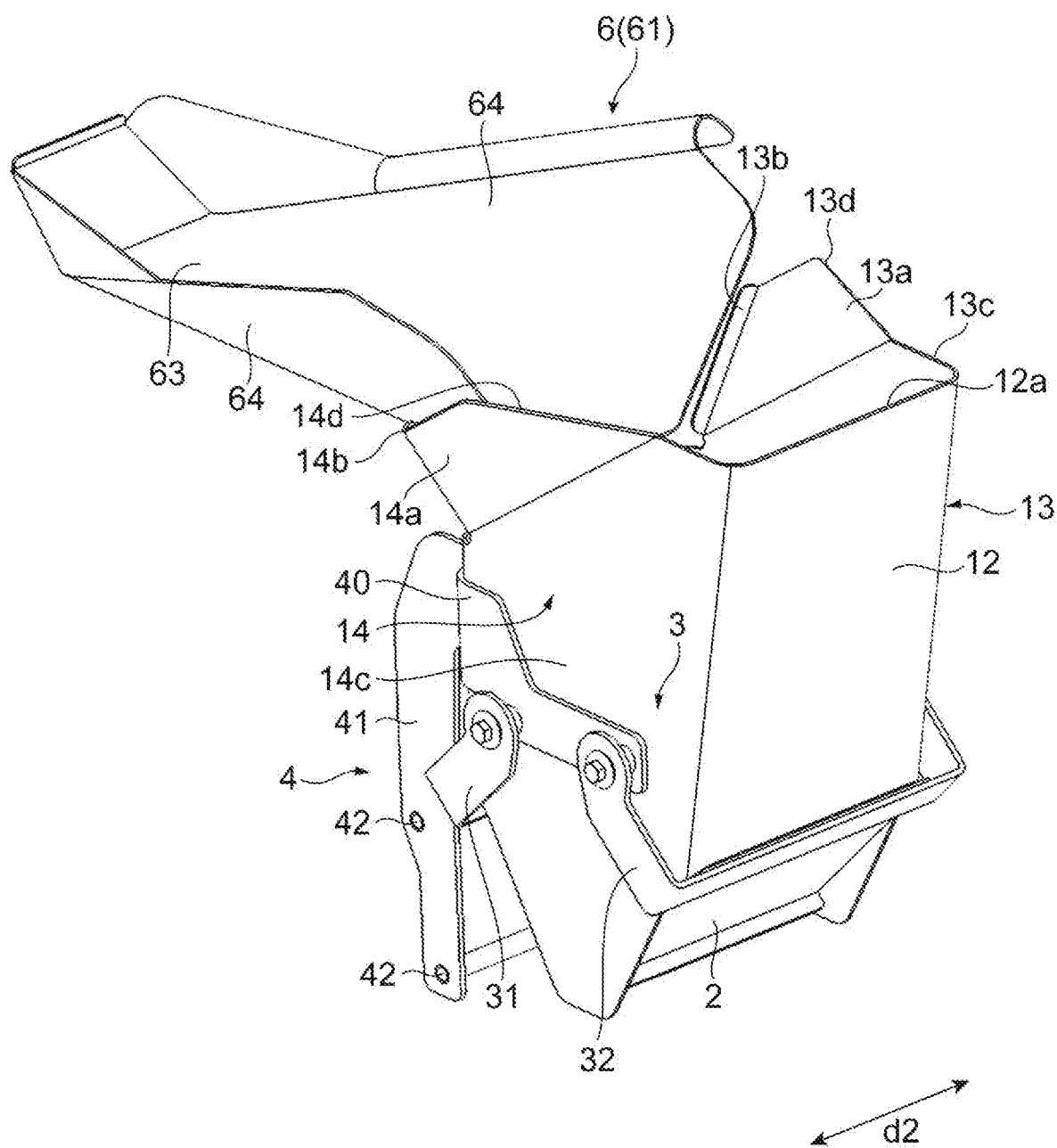
FIG. 4 is an external perspective view of a trough and the hopper in the combination weighing device in FIG. 1 viewed obliquely from above.
Figure 5:
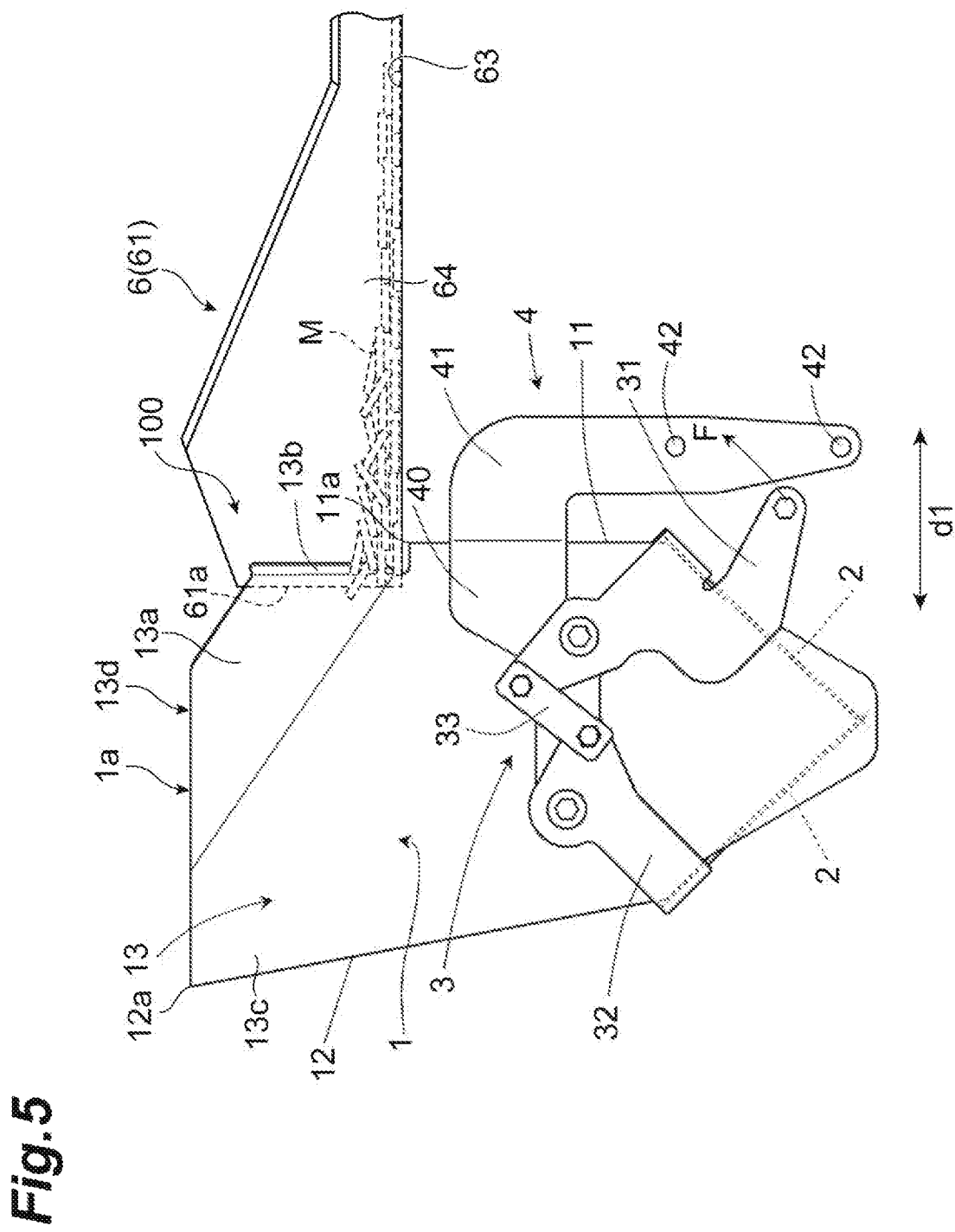
FIG. 5 is a side view of the trough and the hopper in the combination weighing device in FIG. 1 viewed from a lateral side.
Figure 6:
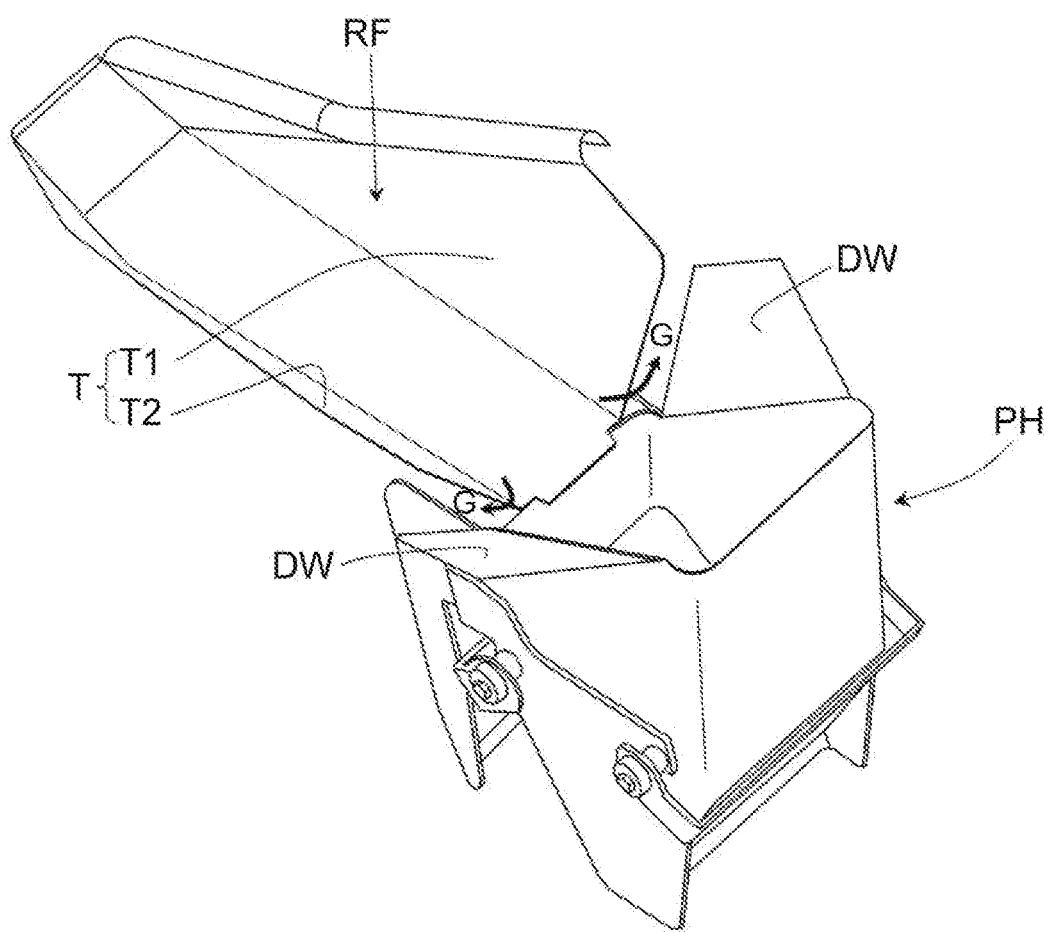
FIG. 6 is an external perspective view of a trough and a hopper in a conventional combination weighing device viewed obliquely from above.
Figure 7:
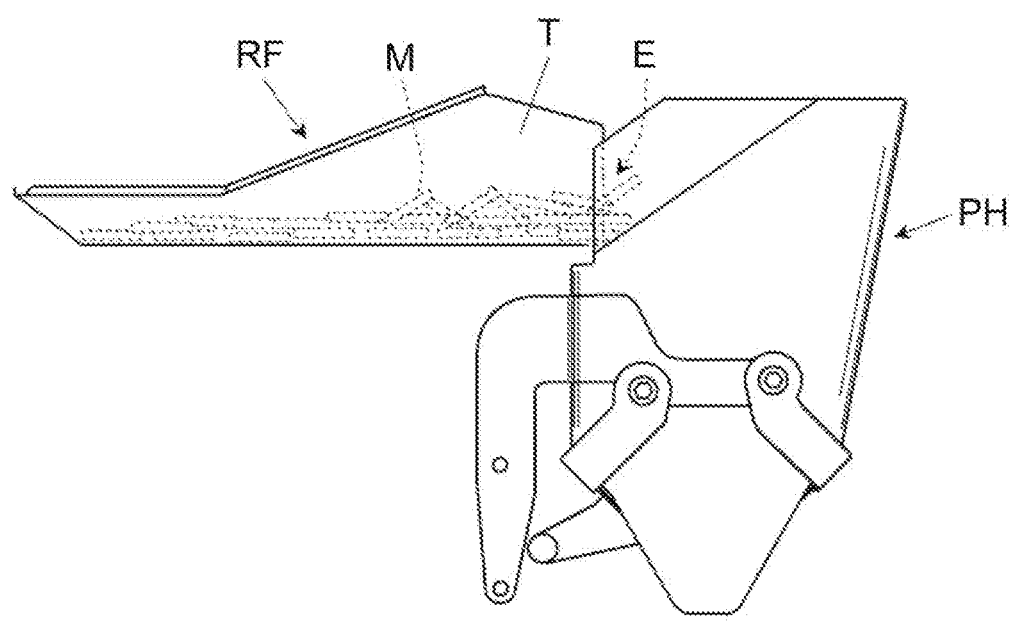
FIG. 7 is a side view of the trough and the hopper in the conventional combination weighing device viewed from a lateral side.

FIG. 3 is a rear view of the pool hopper in FIG. 2 in a slightly stooped state. FIG. 4 is an external perspective view of the trough and the hopper in the combination weighing device in FIG. 1 viewed obliquely from above. FIG. 5 is a side view of the trough and the hopper in the combination weighing device in FIG. 1 viewed from a lateral side. In these FIGS. 3 to 5, the pool hopper 100 includes a hopper body 1, gates 2, a link mechanism 3, and a locking tool 4.

The hopper body 1 is open at the top and bottom. The hopper body 1 has an upper end opening 1a to which the articles M are supplied from the trough 61 that conveys the articles M in a first direction d1, and a lower end opening 1b from which the articles M are discharged. The gates 2 open and close the lower end opening 1b of the hopper body 1 from which the articles M are discharged. The link mechanism 3 is a mechanism that opens and closes the gates 2. The locking tool 4 detachably mounts the hopper body 1 on a frame of the device.

The hopper body 1 includes four sidewalls (a first sidewall 11, a second sidewall 12, a third sidewall 13, and a fourth sidewall 14), and is formed in a rectangular tube shape. That is, the hopper body 1 includes the first sidewall 11 that faces the trough 61 side, the second sidewall 12 that is located at the position facing the first sidewall 11 in the first direction d1 and prevents the articles M conveyed from the trough 61 from jumping out, and the third sidewall 13 and the fourth sidewall 14 that are arranged so as to face each other in a second direction d2 intersecting with the first direction d1 and arranged in a direction intersecting with the first and the second sidewalls 11 and 12 and that connect between the first sidewall 11 and the second sidewall 12. The upper end of the first sidewall 11 is formed one step lower than the upper end of the second sidewall 12. Above the upper end of the first sidewall 11, the distal end portion 61a of the trough 61 is arranged in a non-contact state.

The third sidewall 13 has a body portion (first body portion) 13c, a corner portion (first corner portion) 13a that is bent with respect to the body portion 13c, and an edge portion (first edge portion) 13b that is bent with respect to the corner portion 13a. The fourth sidewall 14 has a body portion (second body portion) 14c that is arranged substantially parallel to the body portion 13c, a corner portion (second corner portion) 14a that is bent with respect to the body portion 14c, and an edge portion (second edge portion) 14b that is bent with respect to the corner portion 14a.

The corner portion 13a is formed to include a part of an edge 13d that connects an upper end 11a of the first sidewall 11 and an upper end 12a of the second sidewall 12 in the third sidewall 13. The corner portion 14a is formed to include a part of an edge 14d that connects the upper end 11a of the first sidewall 11 and the upper end 12a of the second sidewall 12 in the fourth sidewall 14.

The corner portion 13a adjacent to the distal end portion 61a of the trough 61 in the third sidewall 13 and the corner portion 14a adjacent to the distal end portion 61a of the trough 61 in the fourth sidewall 14 are bent in direction away from the distal end portion 61a of the trough 61. The trough 61 includes a bottom surface 63 that is a conveying surface for the articles M, and both sidewalls 64, 64 that stand inclining outward from both sides along the first direction d1 of the bottom surface 63. Because a pair of sidewalls 64, 64 facing each other are inclined outward, the corner portion 13a of the third sidewall 13 and the corner portion 14a of the fourth sidewall 14, which face each other and are adjacent to the sidewalls 64, in the hopper body 1 are bent in direction away from the sidewalls 64, 64 of the trough 61. The corner portion 13a is inclined along one of the sidewalls 64 in the trough 61 and the corner portion 14a is inclined along the other sidewall 64 in the trough 61.

The corner portion 13a and the corner portion 14a are bent in direction away from each other in the second direction d2, and the edge portion 13b and the edge portion 14b are bent in direction closer to each other in the second direction d2. The edge portion 13b is bent with respect to the corner portion 13a in a direction closer to one of the paired sidewalls 64, 64 of the trough 61 so as to come close to the one sidewall 64 of the trough 61 in a non-contact manner. The edge portion 14b is bent in a direction closer to the other of the paired sidewalls 64, 64 of the trough 61 so as to come close to the other sidewall 64 of the trough 61 in a non-contact manner.

The height of the bent edge portions 13b and 14b (the amount of bend) is about several millimeters (for example, about 3 to 5 mm) from each of the corner portions 13a and 14a. By the height of such an extent, the articles M do not jump out from gaps G between the trough 61 and each of the corner portions 13a and 14a. Thus, the cost-saving pool hopper 100 can be obtained.

The gates 2 are made up of double swing gates that open and close to directions opposite to each other. The gates 2 may be a single swing gate for which only one gate facing each other opens and closes. The link mechanism 3 that opens and closes the gates 2 is of a known configuration including left and right levers 31 and 32 mounted on each of the gates 2, 2, and a link 33 coupling the left and right levers 31 and 32. The left and right gates 2, 2 simultaneously open up in the opposite directions when a roller 34 attached to the distal end portion of the lever 31 on one side is flipped up by a drive lever not depicted in an arrow direction F.

Note that, the drive lever for opening and closing not depicted meshes with the roller 34 at the top and bottom, and as the drive lever constrains the top and bottom of the roller 34 at a predetermined position, the left and right gates 2, 2 are retained in a closed state.

The locking tool 4 is made up of a pair of reinforcing frames 40 that are fixed along the wall surfaces of the first sidewall 11 and the third sidewall 13 and fixed along the wall surfaces of the first sidewall 11 and the fourth sidewall 14, a pair of brackets 41 that extend from the corresponding reinforcing frames 40 and project in the perpendicular direction from the first sidewall 11, and upper and lower rods 42 that are bridged between the brackets 41. When the vertically separated rods 42 are hooked onto a hook not depicted on the device body side, the entire pool hopper 100 can be detachably attached to the device body.

Because one of the gaps G provided between the distal end portion 61a of the trough 61 in the supply feeder 6 and the corner portion 13a of the pool hopper 100 and the other gap G provided between the distal end portion 61a of the trough 61 in the supply feeder 6 and the corner portion 14a of the pool hopper 100 are set to a size that prevents the articles M from jumping out, a situation in which the articles M jump out from the gaps G, G and fall into the collecting chute S does not happen.

A series of operations of the combination weighing device 200 has conventionally been known, and the detailed description is hence omitted.

The operation and effect of the pool hopper 100 and the combination weighing device 200 in the above-described embodiment will be described.

In the pool hopper 100 of the above-described embodiment, it is possible to prevent the articles M from jumping out from the gaps G, G between the distal end portion 61a of the trough 61 and each of the corner portions 13a and 14a that are bent in direction away from the distal end portion 61a of the trough 61. Because of this, with a simple structure, it is possible to prevent the articles M thrown in to the pool hopper 100 from the supply feeder 6 from jumping out from the pool hopper 100. That is, the low-cost pool hopper 100 can be obtained. Moreover, because the pool hoppers 100 are fitted to the combination weighing device 200, it is possible to eliminate a situation in which the articles M jump out from the pool hopper 100. Thus, the combination weighing device 200 that has no adverse effect on packaging of the articles M at a subsequent process can be obtained.

The pool hopper 100 of the above-described embodiment has the corner portion 13a that is bent with respect to the body portion 13c, and the edge portion 13b that is bent with respect to the corner portion 13a, and has the corner portion 14a that is bent with respect to the body portion 14c, and the edge portion 14b that is bent with respect to the corner portion 14a. With such a third sidewall 13, the corner portion 13a and the edge portion 13b can be easily formed by bending. Furthermore, with such a fourth sidewall 14, the corner portion 14a and the edge portion 14b can be easily formed by bending.

In the pool hopper 100 of the above-described embodiment, the corner portion 13a and the corner portion 14a are bent in direction away from each other in the second direction d2, and the edge portion 13b and the edge portion 14b are bent in direction closer to each other in the second direction d2. Accordingly, it is possible to widely receive the articles M that are supplied from the trough 61 and it is possible to prevent the articles M from jumping out from the pool hopper 100.

In the pool hopper 100 of the above-described embodiment, the corner portion 13a is inclined along one of the sidewalls 64 of the trough 61, the corner portion 14a is inclined along the other sidewall 64 of the trough 61, the edge portion 13b is in close proximity to the one sidewall 64 of the trough 61 in a non-contact state, and the edge portion 14b is in close proximity to the other sidewall 64 of the trough 61 in a non-contact state. Accordingly, because it is possible to reduce the articles M jumping out from one of the gaps G between one of the sidewalls 64, 64 of the trough 61 and the corner portion 13a of the pool hopper 100 and the other gap G between the other sidewall 64 of the trough 61 and the corner portion 14a of the pool hopper 100, the pool hopper 100 that is capable of handling a wide variety of articles M and is excellent in versatility can be obtained. Furthermore, by the configuration with only bending the edge portions 13b and 14b of the corner portions 13a and 14a with respect to the trough 61 side, it is possible to prevent the articles M from jumping out. Accordingly, because there is no need to provide a detachable blocking plate along the sidewall upper edge portion of the hopper as in the device of the above-described JP-A-2016-114375, the low-cost pool hopper 100 can be obtained.

The combination weighing device 200 of the above-described embodiment can reduce the articles M jumping out from the pool hopper 100 even when a variety of articles M are supplied to the pool hopper 100 from the trough 61, and thus a combination weighing device of high versatility can be obtained.

As in the foregoing, the pool hopper 100 and the combination weighing device 200 of the embodiment have been described. However, the pool hopper 100 and the combination weighing device 200 are not limited to those of the above-described embodiment.

For example, the pool hopper 100 may be in a shape in which the second sidewall 12 is bulged to the outside. Furthermore, the link mechanism 3 may be provided with a spring. The combination weighing device 200 may be in a configuration in which a booster hopper is arranged at a lower stage of the weighing hopper WH. Moreover, in the above-described combination weighing device 200, as illustrated in FIG. 1, the plurality of weighing machines 7 are arrayed around the distributing feeder 5 in a circle. However, the weighing machines 7 may be linearly arrayed in juxtaposition.

In addition, the hopper may include a hopper body that is open at the top and bottom, and a gate configured to open and close a lower end opening of the hopper body, wherein an upper end of a first sidewall of the hopper body may be formed one step lower than an upper end of a second sidewall facing the first sidewall, a distal end portion of a trough for conveying articles may be made to face above the lower-formed first sidewall, the corner portions adjacent to the distal end portion of the trough in a third sidewall and a fourth sidewall that intersect with the first sidewall and the second sidewall and face each other may be bent in direction away from the distal end portion of the trough and also the edge portions on the distal end portion side of the trough in the respective corner portions may be bent in direction closer to the distal end portion of the trough.

What is claimed is:

1. A hopper comprising:
a hopper body having an upper end opening to which articles are supplied from a trough configured to convey the articles along a first direction and a lower end opening from which the articles are discharged; and
a gate configured to open and close the lower end opening, wherein
the hopper body has a first sidewall provided below a distal end portion of the trough in a conveying direction of the articles, and a second sidewall provided so as to face the first sidewall in the first direction,
an upper end of the first sidewall is formed at a position lower than an upper end of the second sidewall,
the hopper body has a third sidewall and a fourth sidewall that face each other in a second direction intersecting with the first direction and that connect between the first sidewall and the second sidewall, and
a first corner portion adjacent to the distal end portion of the trough in the third sidewall and a second corner portion adjacent to the distal end portion of the trough in the fourth sidewall are bent in direction away from the distal end portion of the trough and also a first edge portion adjacent to the distal end portion of the trough in the first corner portion and a second edge portion adjacent to the distal end portion of the trough in the second corner portion are bent in direction closer to the distal end portion of the trough.

2. The hopper according to claim 1, wherein
the third sidewall has a first body portion, the first corner portion that is bent with respect to the first body portion, and the first edge portion that is bent with respect to the first corner portion, and
the fourth sidewall has a second body portion that is arranged substantially parallel to the first body portion, the second corner portion that is bent with respect to the second body portion, and the second edge portion that is bent with respect to the second corner portion.

3. The hopper according to claim 1, wherein
the first corner portion and the second corner portion are bent in direction away from each other in the second direction, and
the first edge portion and the second edge portion are bent in direction closer to each other in the second direction.

4. The hopper according to claim 1, wherein
the first corner portion is formed to include a part of an edge portion that connects an upper end of the first sidewall and an upper end of the second sidewall in the third sidewall, and the second corner portion is formed to include a part of an edge portion that connects the upper end of the first sidewall and the upper end of the second sidewall in the fourth sidewall.

5. The hopper according to claim 1, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

6. A combination weighing device comprising:
a plurality of supply feeders configured to convey articles; and
a plurality of hoppers according to claim 1 that are arrayed below distal end portions in the first direction of the troughs included in the supply feeders so as to correspond thereto, wherein
the distal end portions of the supply feeders are arranged above the upper end openings of the corresponding hoppers.

7. The hopper according to claim 2, wherein
the first corner portion and the second corner portion are bent in direction away from each other in the second direction, and
the first edge portion and the second edge portion are bent in direction closer to each other in the second direction.

8. The hopper according to claim 2, wherein
the first corner portion is formed to include a part of an edge portion that connects an upper end of the first sidewall and an upper end of the second sidewall in the third sidewall, and
the second corner portion is formed to include a part of an edge portion that connects the upper end of the first sidewall and the upper end of the second sidewall in the fourth sidewall.

9. The hopper according to claim 3, wherein
the first corner portion is formed to include a part of an edge portion that connects an upper end of the first sidewall and an upper end of the second sidewall in the third sidewall, and
the second corner portion is formed to include a part of an edge portion that connects the upper end of the first sidewall and the upper end of the second sidewall in the fourth sidewall.

10. The hopper according to claim 7, wherein
the first corner portion is formed to include a part of an edge portion that connects an upper end of the first sidewall and an upper end of the second sidewall in the third sidewall, and
the second corner portion is formed to include a part of an edge portion that connects the upper end of the first sidewall and the upper end of the second sidewall in the fourth sidewall.

11. The hopper according to claim 2, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

12. The hopper according to claim 3, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

13. The hopper according to claim 4, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

14. The hopper according to claim 7, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

15. The hopper according to claim 8, wherein
the trough includes a bottom surface that is a conveying surface for the article, and a pair of sidewalls that stand inclining in directions away from each other in the second direction from both end portions along the first direction in the bottom surface,
the first corner portion is inclined along one of the sidewalls of the trough,
the second corner portion is inclined along the other sidewall of the trough,
the first edge portion is in close proximity to the one sidewall of the trough in a non-contact state, and
the second edge portion is in close proximity to the other sidewall of the trough in a non-contact state.

16. The hopper according to claim 9, wherein
the trough includes a bottom surface that is a conveying surface for the article, and a pair of sidewalls that stand inclining in directions away from each other in the second direction from both end portions along the first direction in the bottom surface, the first corner portion is inclined along one of the sidewalls of the trough, the second corner portion is inclined along the other sidewall of the trough, the first edge portion is in close proximity to the one sidewall of the trough in a non-contact state, and the second edge portion is in close proximity to the other sidewall of the trough in a non-contact state.

17. The hopper according to claim 10, wherein the trough includes a bottom surface that is a conveying surface for the article, and a pair of sidewalls that stand inclining in directions away from each other in the second direction from both end portions along the first direction in the bottom surface, the first corner portion is inclined along one of the sidewalls of the trough, the second corner portion is inclined along the other sidewall of the trough, the first edge portion is in close proximity to the one sidewall of the trough in a non-contact state, and the second edge portion is in close proximity to the other sidewall of the trough in a non-contact state.

* * * * *